March 28, 1944.  G. A. BRACE  2,345,454

REFRIGERATION

Filed May 22, 1939  2 Sheets-Sheet 1

INVENTOR
George A. Brace
BY
Harry S. Dumasse
ATTORNEY

March 28, 1944.  G. A. BRACE  2,345,454
REFRIGERATION
Filed May 22, 1939  2 Sheets-Sheet 2

INVENTOR
George A. Brace
BY
Harry S. Demarest
ATTORNEY

Patented Mar. 28, 1944

2,345,454

UNITED STATES PATENT OFFICE 2,345,454

REFRIGERATION

George A. Brace, Winnetka, Ill., assignor to The Hoover Company, North Canton, Ohio, a corporation of Ohio Application May 22, 1939, Serial No. 274,892

19 Claims. (Cl. 62—119.5)

This invention relates to the art of refrigeration and more particularly to a novel arrangement of an absorption refrigerating system utilizing inert gas and a means for providing fluid distribution therein.

Heretofore various attempts have been made to provide for division of a liquid stream in an absorption refrigerating system into a plurality of individual streams. These attempts have met with but little success due to difficulties inherent in the dividers and in the refrigerating system per se. Mechanical dividers will only divide the stream into equal parts, they are seriously affected by slight irregularities in the liquid flow and in the leveling of the refrigerating system and its components, they require the use of moving parts inside of an hermetically sealed system, they must be precision manufactured and they are very vulnerable to slight corrosion and to tramp material circulating through the system. In addition to the above, previous arrangements could not divide the liquid stream into unequal components and they could not handle streams of very small volume such as those commonly found in absorption refrigerating machines.

Accordingly, it is a principal object of this invention to provide an absorption refrigerating system including liquid dividing means which overcomes the above-mentioned defects.

It is a further object of the invention to provide a refrigerating system including therein elements constructed and arranged to divide a very small stream of liquid into a plurality of individual streams bearing an accurately predetermined quantity ratio each to the other.

It is a further object of the invention to provide a fluid dividing element comprising a plurality of capillary fluid flow devices which may readily be constructed and arranged to bear any desired capacity ratio to each other.

It is a further object of the invention to provide an absorption refrigerating system including a reflux rectifier, an evaporator having a plurality of individual evaporating sections and a capillary fluid dividing apparatus arranged to supply predetermined proportions of liquid refrigerant to the reflux rectifier and to each of the evaporator sections without the intervention of moving parts or accurately machined mechanisms.

It is a further object of the invention to provide an absorption refrigerating system of the three-fluid type embodying a reflux rectifier, an evaporator having a plurality of individual sections and a multiple wick dividing element so constructed and arranged that each section of the evaporator and the reflux rectifier are supplied with refrigerant flowing through one of the wicks and in which the wicks may be readily constructed of various sizes to provide any desired predetermined discharge ratios into the reflux rectifier and into the individual evaporator sections without the intervention of moving parts.

It is still another object of the invention to provide a novel arrangement of a refrigerating system embodying a reflux rectifier and a capillary refrigerant liquid diversion element in a cabinet in a manner to secure high space economy and operating efficiency.

It is a still further object of the invention so to arrange the cabinet of a refrigerating system that a combined dividing and pre-cooling element may conveniently be embedded in the insulation of a removable portion of the cabinet.

Other objects and advantages of the invention will become more apparent as the description proceeds when taken in connection with the accompanying drawings, in which.

Figure 1:
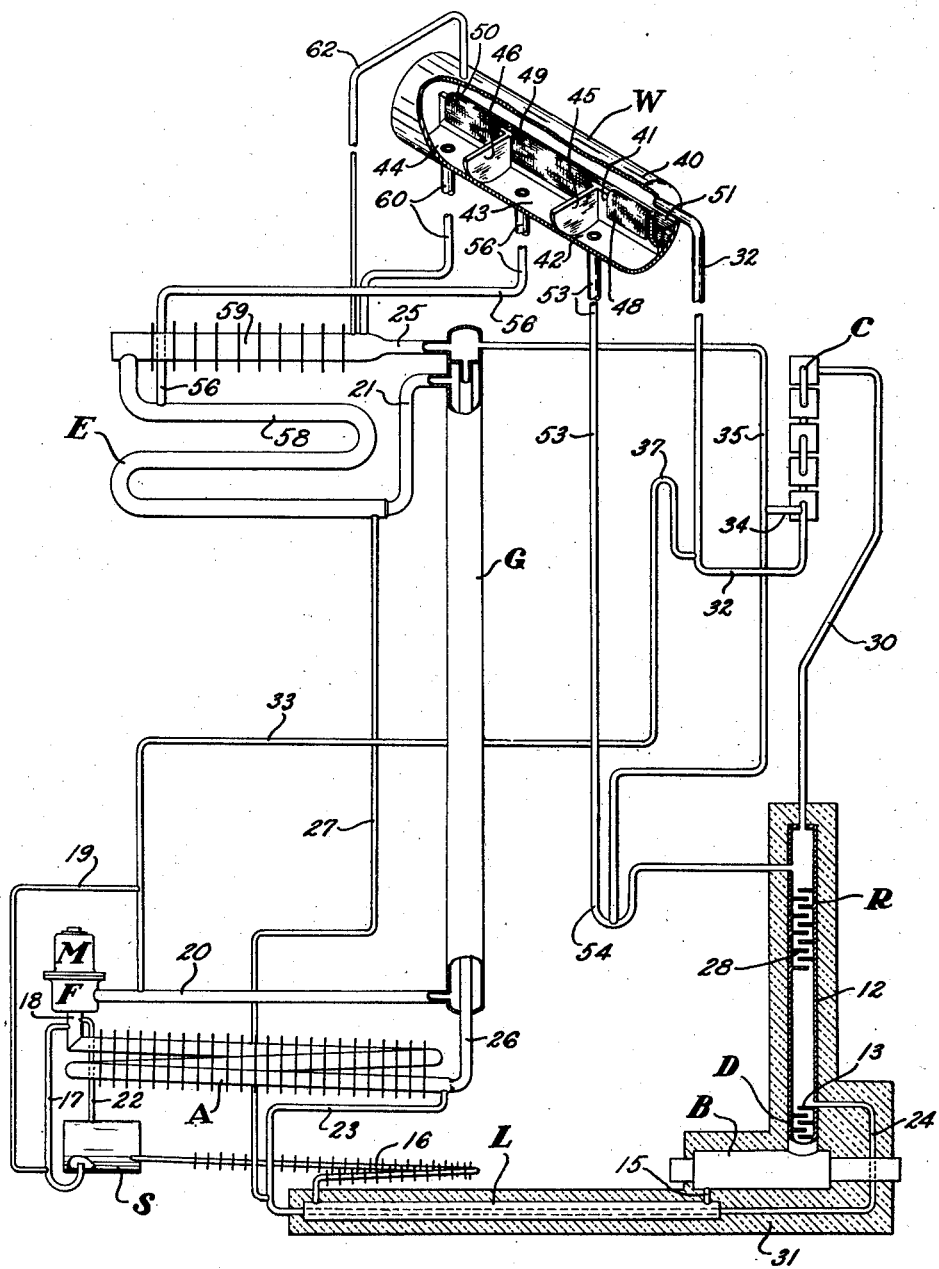
Figure 1 is a diagrammatic representation of the three-fluid absorption refrigerating system embodying the present invention.

Referring now to the drawings and first to Figure 1 thereof, there is illustrated a refrigerating system comprising a boiler B, an analyzer D, a reflux rectifier R, a tubular air-cooled condenser C, a diversion chamber W, an evaporator E, a gas heat exchanger G, a tubular air-cooled inclined absorber A, a solution reservoir S, a solution heat exchanger L, a circulating fan F, and an electrical motor M for driving the circulating fan. These elements are suitably interconnected by various conduits to be described more fully hereinafter to form a plurality of gas and liquid circuits constituting a complete refrigerating system.

The above described system will be charged with a suitable refrigerant, such as ammonia, a suitable absorbent, such as water, and an inert pressure equalizing medium, preferably a dense inert gas like nitrogen.

The boiler B may be heated in any suitable manner as by a combustible fuel burner or an electrical cartridge heater. The heater for the boiler B and the electrical current for energizing the circulator motor M will be controlled in any suitable or desired manner. A preferred control mechanism is disclosed and claimed in United States Letters Patent No. 2,228,343, dated January 14, 1941.

The application of heat to the strong solution normally contained in the boiler B generates refrigerant vapor therefrom. The vapors so generated pass into a vertically extending elongated dome 12 which forms a part of the boiler assembly. The lower portion of the dome 12 is provided with a plurality of staggered plates 13 which form the analyzer D. The vapor generated in the boiler passes upwardly through the analyzer and across the surfaces of the plates 13 in counterflow to strong solution flowing downwardly over the plates. This action serves to generate additional refrigerant vapor from the strong solution flowing over the plates 13, the heat of vaporization being supplied by the heat of condensation of absorption solution vapor which was formed in the boiler.

The generation of vapor from the solution in the boiler weakens the solution which is then conveyed from the boiler to the solution reservoir S by way of the conduit 15, the outer path of the liquid heat exchanger L, and the finned air-cooled solution pre-cooler 16. The weak solution collecting in the reservoir S is then conveyed therefrom by the conduit 17 into the gas discharge pipe 18 at the upper end of the absorber A. It is apparent that the conduit 18 is at an elevation appreciably above the liquid level prevailing in the boiler-analyzer system wherefore the lean solution must be elevated thereinto. For this purpose a small gas bleed conduit 19 is connected between the discharge conduit 20 of the circulating fan F and the conduit 17 below the liquid level normally prevailing in the boiler-analyzer system wherefore the weak solution is elevated into the conduit 18 by gas lift action. A small vent conduit 22 is connected between the upper portion of the reservoir S and the conduit 18 to relieve the reservoir of vapor.

The weak solution supplied to the absorber A flows downwardly therethrough by gravity in counterflow relationship with a mixture of inert gas and refrigerant vapor which is flowing upwardly therethrough. The refrigerant vapor content of the mixture is absorbed by the solution in the absorber and the heat of absorption is rejected to cooling air flowing over the exterior walls of the absorber conduit and the air-cooling fins mounted thereon. The resulting strong solution formed in the absorber drains from the bottom portion thereof from which point it is conveyed into the upper portion of the analyzer D by way of the conduit 23, the inner path of the liquid heat exchanger L, and a conduit 24, thus completing the absorption solution circuit.

The lean pressure equalizing medium formed in the absorber by the absorption of refrigerant vapor therefrom is conveyed from the upper end of the absorber into the suction inlet of the circulating fan F by means of the conduit 18. The pressure equalizing medium is placed under pressure by the circulating fan F and is conveyed therefrom to the bottom portion of the evaporator E by way of the conduit 20, the outer path of the gas heat exchanger G, and a conduit 21 connecting the bottom portion of the evaporator to the upper end of the outer path of the gas heat exchanger G.

It will be understood that the evaporator itself is only diagrammatically illustrated herein and that any desired or preferred evaporator construction may be utilized without departing from the spirit or the scope of the present invention. In the evaporator the inert gas flows in contact with refrigerant liquid supplied in a manner to be described more fully hereinafter. The refrigerant liquid evaporates into the inert gas to produce useful refrigeration and the resulting rich mixture of refrigerant vapor and inert gas is conveyed from the upper end of the evaporator E to the bottom end of the absorber A by means of the conduit 25 which connects the upper end of the evaporator to the upper inner end of the inner path of the gas heat exchanger G from which the rich mixture is then conveyed into the bottom portion of the absorber A by means of the conduit 26. The rich mixture flows upwardly through the absorber in counterflow relationship to the weak solution flowing downwardly therethrough in a manner described heretofore. The evaporator is drained by a conduit 27 to the strong solution return line 23.

The refrigerant vapor which has passed through the analyzer D and has been partially stripped of the absorption solution vapor mixed therewith then passes upwardly through the dome 12 into the reflux rectifier R. The reflux rectifier R comprises a plurality of staggered plates or baffles 28 in the upper portion of the dome 12 and over which the refrigerant vapor is forced to pass. The refrigerant vapor is brought into intimate contact with refrigerant liquid which is supplied to the reflux rectifier R from a source to be described more fully hereinafter and which flows downwardly across the plates 28 and in contact with the refrigerant vapor. Substantially all the liquid refrigerant thus supplied to the rectifier is re-evaporated therein by the heat of condensation of the absorption solution vapor remaining in the vapor mixture after passing through the analyzer D. Any liquid refrigerant which is not re-evaporated and the absorption solution formed in the reflux rectifier then drop downwardly through the dome 12 into the analyzer D in the form of very strong solution of refrigerant and absorption solution. The substantially pure refrigerant vapor discharging from the rectifier R is then conveyed to the upper portion of the condenser C by means of the conduit 30.

The boiler, analyzer, liquid heat exchanger and the reflux rectifier are all encased in insulating material 31 to prevent heat loss therefrom. As shown the insulating material 31 is in the form of a solid block; however, individual insulating blocks may be provided for the various elements if desired. The insulating blanket around the boiler assembly—the boiler, the analyzer and the reflux rectifier—prevents heat loss therefrom and improves the efficiency of the whole unit.

The reflux rectifier and analyzer combination serve to conserve substantially all the heat absorbed by the solution in the boiler. Due to the very complete elimination of absorption solution vapor from the vapor supplied to the condenser and the utilization of the heat of condensation of absorption solution vapor to produce refrigerant vapor, the thermal efficiency of the generating portion of the system is very high and the condenser-evaporator circuit is not burdened with absorption solution.

The refrigerant vapor supplied to the condenser C is liquefied therein by being in heat exchange with cooling air flowing over the outer walls of the condenser tubes and the heat rejecting fins mounted thereon. The refrigerant vapor thus liquefied in the condenser flows to the bottom thereof into a depending U-shaped conduit 32, one leg of which connects directly to the bottom portion of the condenser C and the other and longer leg of which discharges into the top portion of the division chamber W.

It is apparent that the division chamber W is at an elevation appreciably above the level of the refrigerant liquid which has collected in the U-shaped bottom portion of the conduit 32 and that some means must be provided to elevate the refrigerant liquid from the bottom portion of the conduit 32 into the chamber W. For this purpose a small gas bleed conduit 33 is connected between the gas bleed conduit 19 and the longer leg of the conduit 32 below the liquid level normally prevailing therein in order to elevate the liquid refrigerant into the division chamber W by gas lift action. The conduit 33 will be of small cross-sectional area to restrict the gas flow therethrough to the small amount required to operate the pump 32.

The condenser side of the U-shaped conduit 32 is vented by means of a conduit 34 to a combined vent and overflow conduit 35 one end of which connects to the rich gas side of the gas heat exchanger G and the other end of which connects into the reflux rectifier R in a manner to be described more fully hereinafter. The conduit 34 also establishes the maximum liquid level in the conduit 32 and thus acts as an overflow for the condenser C in the event of an abnormal collection of liquid refrigerant therein. It will be noted that the conduit 33 contains an upstanding inverted U-shaped portion 37 adjacent its point of connection to the conduit 32. This upstanding loop in the conduit 33 extends above the level of the point of connection between the conduits 34 and 35 and is provided in order to prevent discharge of liquid refrigerant into the conduit 33 during idle periods of the circulating fan.

As herein illustrated, the division chamber W comprises an hermetically sealed horizontally positioned cylindrical chamber 40 which is provided with an upstanding partition 41 which is to the right of the central portion of the chamber as viewed in Figure 1. The left hand side of the partition 41, as viewed in Figure 1, is divided into three small longitudinally extending pockets 42, 43 and 44 by small partitions 45 and 46 which extend forwardly of the partition 41 and terminate against the inner side wall of the chamber 40. The liquid refrigerant supply conduit 32 discharges into the chamber 40 to the rear or right hand side of the partition 41, as viewed in Figure 1.

Due to the fact that the partition 41 is positioned to the right or rearwardly of the center line of the vessel W, as viewed in Figure 1, the lowest elevation at the bottom portion of the elongated chamber 51 is higher than the bottom portions of the chambers 42, 43 and 44. A plurality of wicks 48, 49 and 50 extend over the partition 41 from the elongated chamber 51 on the rear or right side thereof into the smaller chambers 42, 43 and 44, respectively. As is illustrated in the drawings, in each case the short side of the wick as measured from the top of the partition 41 extends downwardly into the chamber 51 and the longest side of the wick extends downwardly just short of the bottom portion of its associated one of the chambers 42, 43 and 44, whereby each wick may feed liquid supplied to the chamber 51 over the partition 41 into its associated chamber by capillary action. Thus, it will be noted that the feed or supply side of the wick is appreciably shorter than the discharge side thereof. The liquid refrigerant which is supplied to the compartment 51 through the conduit 32 collects therein approximately to the level indicated and is conveyed over the partition 41 and is discharged into the compartments 42, 43 and 44 by the appropriate wick. The wick 48 is appreciably smaller than the wicks 49 and 50 and the wick 49 in turn is appreciably larger than the wick 50. By this arrangement the quantity of the liquid discharged into the compartment 51 is divided into three unequal streams bearing a predetermined relationship each to the other. The relationship or ratio of the various liquid streams is proportional to the sizes of the individual wicks.

The wicks 48, 49 and 50 may be made of any suitable material whether it be textile, mineral or metallic as may be desired for a particular installation. It is only necessary that the material be of such nature that it will convey the liquid supplied thereto by the usual wick or capillary action.

The bottom portion of the compartment 42 is drained by means of a conduit 53 into the upper portion of the reflux rectifier R. The conduit 53 includes a downwardly extending U-shaped portion 54 in order to provide a liquid seal to prevent refrigerant vapor passing through the reflux rectifier from short circuiting the condenser and discharging into the division chamber W. The lower portion of the U-shaped vent and drain conduit 35 is connected to the bottom portion of the loop 54 in order to drain excess liquid refrigerant from the condenser into the reflux rectifier to seal the conduit 35 against passage of vapor therethrough.

The central pocket 43 of the dividing vessel W which is supplied with liquid by the largest wick, namely 49, is drained by means of a conduit 56 into the upper portion of the fast-freezing section 58 of the evaporator E. The wick 49 is made large in order to take the major portion of the liquid refrigerant supplied to the chamber 51 into the fast-freezing portion of the evaporator which is that portion normally called upon to sustain the greatest portion of the total refrigerating load.

The bottom portion of the chamber 44 is drained into the gas discharge end of the box-cooling evaporator section 59 by means of a drain conduit 60. The wick 50 which supplies the liquid to the conduit 60 is smaller than the wick 49 for the reason that the box-cooling load in domestic refrigerating systems is usually less than the fast-freezing load imposed upon such refrigerating apparatus.

Though a particular arrangement and proportion of the various wicks has been illustrated and described herein it is by no means the only arrangement as particular designs of refrigerators designed to meet particular conditions may necessitate the selection of different ratios between the various wicks. For example, in some installations it may be desirable to supply the major portion of the refrigerant liquid to the air-cooling section of the evaporator rather than to the freezing or ice-making portion thereof. Thus, the choice of ratios which the various streams of refrigerant liquid are to bear each to the other are to be determined in accordance with the needs of a particular design.

In order to remove the gas discharged into the chamber 51 through the gas lift conduit 32, a vent conduit 62 is provided which connects the top portion of the chamber W to the gas discharge portion of the evaporator, though any other portion of the inert gas circuit normally subjected to a relatively low pressure from the circulating fan would serve just as well. The vent 62 has been illustrated as it may be necessary in some installations. However, in the ordinary case the quantity of liquid flowing through the conduits 56 and 60 will not be sufficient to seal the same and the inert gas discharged into the chamber W by the gas lift pump may escape through these conduits into the evaporator where they are once more in the normal inert gas circuit.

Though the quantity of inert gas discharged into the gas lift pump mechanism 32 is relatively small, that gas passes over a relatively large exposed area of liquid refrigerant in the division chamber and serves to accomplish some pre-cooling therein. The amount of pre-cooling of course will depend again upon the particular design desired for a specific installation of the apparatus. This serves to enhance the efficiency of the apparatus and to minimize or eliminate this load from the evaporating portions proper of the apparatus.

Figure 2:
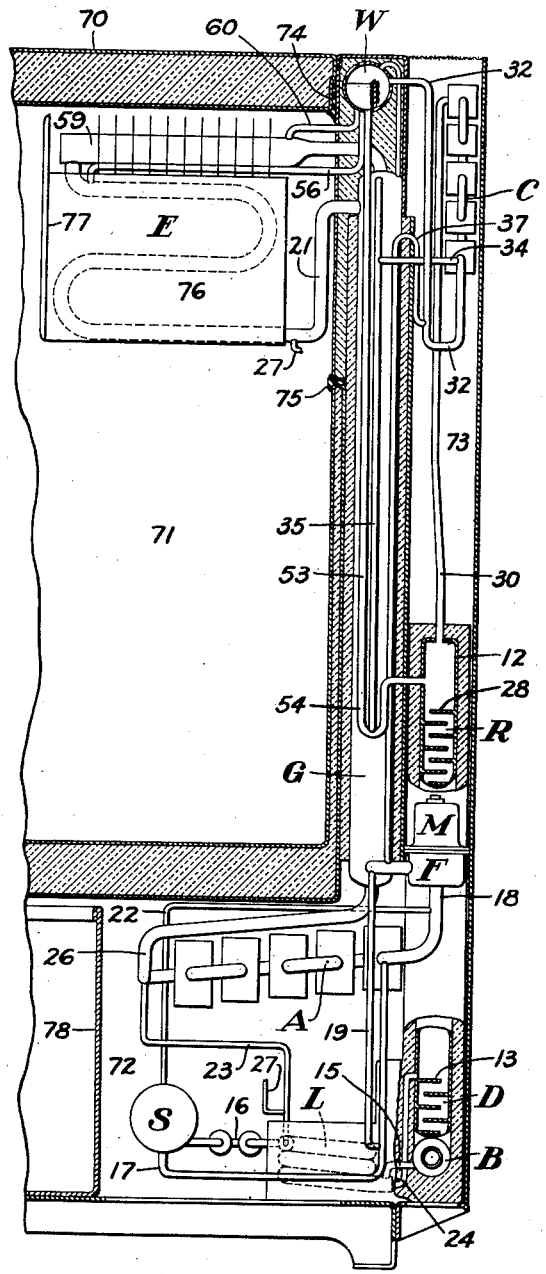
Figure 2 is a partial elevational sectional view illustrating the manner in which the refrigerating system of Figure 1 is mounted in a cabinet.

Referring now to Figure 2, the invention is illustrated in connection with a cabinet. In accordance with the invention a cabinet 70 is provided which includes an insulated storage compartment 71, an underlying mechanism compartment 72, and a rear vertically extending air duct 73. The rear insulated wall of the compartment 71 and the rear portion of the top wall of the compartment 71 are cut out to accommodate an insulated insert element 74 which is shaped to seal the opening thus formed. The insert is suitably sealed by a gasket 75. In the drawings only the top and bottom gaskets are shown but it will be understood that gaskets will also be provided along the joint formed by the vertically extending side walls of the insert 74. The width of the insert will be slightly larger than the width of the greatest dimension of the evaporator casing in order that the evaporator may pass through the opening which the insert fills.

As illustrated in Figure 2, the evaporator is enclosed in a suitable casing 76 which includes a decorative front panel 77 which extends upwardly in front of the box-cooling portion 59 of the evaporator which is not enclosed in the housing 76.

The gas heat exchanger G is embedded, as illustrated, in the rear insulated wall of the compartment 71 and in the insulation of the insert 74. The division chamber W is positioned in the top portion of the insulation of the insert 74 whereby the pre-cooling accomplished therein by the pumping inert gas is not wasted and cold liquid is supplied to the evaporator and to the reflux rectifier. The conduit 53 which supplies liquid refrigerant to the reflux rectifier and the overflow of conduit 35 for the condenser C are also embedded in the insulation of the rear wall of the cabinet and of the insert 74 to remove these elements from the rear flue 73 whereby they do not obstruct air flowing therethrough and to prevent the same from becoming heated. Likewise the pumping gas conduit 37 for the gas lift pump 32 is embedded in the insulation of the rear wall along with the gas heat exchanger assembly.

The combined boiler-analyzer reflux rectifier assembly B, D, R, respectively, occupies an appreciable height and would require that the mechanism compartment be made prohibitively large if it were placed beneath the insulated storage compartment 71. However, in accordance with the present invention, the boiler extends transversely of the mechanism compartment 72 at the bottom rear corner thereof directly beneath the lowermost portion of the flue 73, and the analyzer-rectifier extension on the boiler extends upwardly into the flue 73 and in a corner thereof so as not to offer any interference to the free flow of cooling air upwardly through the duct 73. The insulation around the boiler-analyzer rectifier assembly effectively prevents adverse heating of the cooling air in the flue 73.

The absorber A is positioned in the upper rear portion of the mechanism compartment 72 in a plane inclined downwardly and forwardly of that compartment. The solution pre-cooler 16 and the solution reservoir S are positioned beneath the absorber also in the rear portion of the compartment 72. By reason of this construction a suitable vegetable drawer 78 or the like may be positioned in the front portion of the compartment 72 without in any way interfering with the operation of the system or the various mechanisms constituting parts thereof.

As may be seen from an inspection of Figure 2, cooling air enters the bottom portion of the compartment 72, flows over the solution pre-cooler and the absorber A and then passes into the flue 73 through which it flows upwardly and eventually passes over the condenser C in order to liquefy the refrigerant vapor supplied thereto from the reflux rectifier R.

In Figures 1 and 2 the height of the boiler-analyzer rectifier system has been exaggerated in order clearly to illustrate the difference between the analyzer and rectifier. However, such great height is not necessary from a functional standpoint and the distance between the analyzer and rectifier may be greatly shortened over that illustrated herein.

During normal operation of the system liquid refrigerant formed in the condenser is elevated into the division chamber W by the gas lift pump conduit 32. The liquid refrigerant so discharged into the compartment 51 is then conveyed over the upper edge of the partition 41 by the wicks 48, 49 and 50 in three individual streams which are proportionate to the capacity of each of the individual wicks. One stream so discharged is returned to the refrigerant vapor portion of the circuit in order to eliminate absorption solution therefrom into the reflux rectifier. The larger of the three streams is conveyed into the fast-freezing portion of the evaporator for the purpose of producing ice, freezing desserts and the like, and the third stream of refrigerant conveyed over the partition 41 is discharged into the box-cooling portion of the evaporator in order to refrigerate foodstuffs in the storage compartment.

Figure 3:
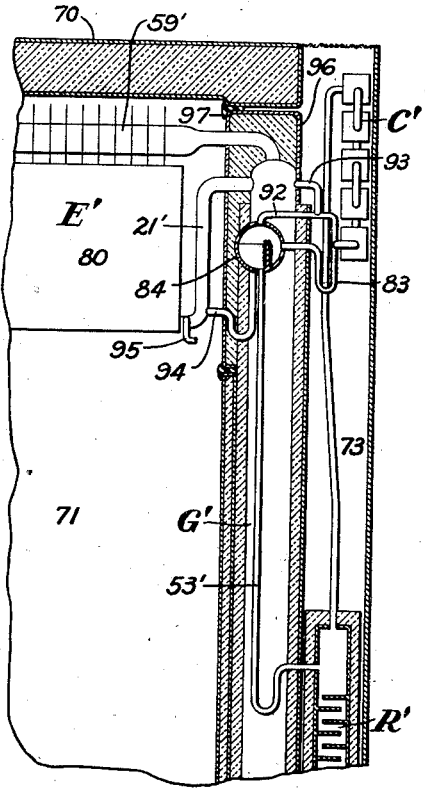
Figure 3 is a fragmentary sectional elevational view of a modified form of the invention embodied in the cabinet.
Figure 4:
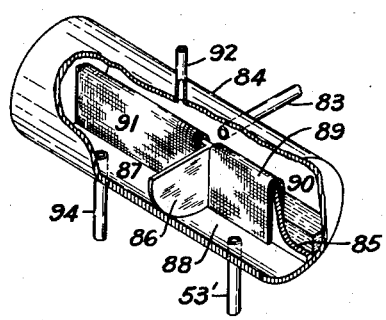
Figure 4 is a partial sectional perspective view of a detail of Figure 3.

Referring now to Figures 3 and 4, there is disclosed a modified form of the invention. Certain parts illustrated in Figures 3 and 4 are identical with elements previously illustrated and described and are therefore given the same reference characters primed.

In this form of the invention the evaporator 80 is of the type in which relatively small diameter conduits are provided and in which the liquid refrigerant supplied to the bottom portion thereof is propelled upwardly through the evaporator by the inert gas stream as the liquid is evaporating into the inert gas. The box-cooling section of the evaporator 59' is, however, the same as that previously described. A preferred form of evaporator is described and claimed in the copending case of Curtis C. Coons and William H. Kitto, Serial No. 386,395, filed April 2, 1941, now Patent No. 2,328,196, dated August 31, 1943.

The liquid refrigerant produced in the condenser C' is conveyed therefrom through a conduit 83 including a downwardly extending U-shaped portion into a division chamber 84. The division chamber 84 is very similar to the division chamber W previously described except that it is provided with only two wicks and is positioned to permit the flow of the liquid refrigerant from the condenser by gravity. The chamber 84 is provided with a partition 85 corresponding to the partition 41 previously described. A partition 86 extends forwardly, as viewed in Figures 3 and 4, of the partition 85 to define a pair of discharge chambers 87 and 88, respectively. A relatively small wick 89 extends over the partition 85 to supply liquid refrigerant from the inlet chamber 90 of the division chamber 84 into the discharge chamber 88, and a wick 91 extends over the partition 85 to supply liquid refrigerant from the inlet chamber 90 to the discharge chamber 87. The upper portion of the chamber 84 is vented by means of a small conduit 92 which connects to a conduit 93 which communicates with the rich gas side of the gas heat exchanger and the condenser side of the conduit 83 in order to function as a condenser vent.

The liquid refrigerant supplied to the chamber 87 is drained from the bottom portion thereof into the lower portion of the lean gas inlet conduit 21' of the evaporator 80 by means of a small conduit 94 which includes the downwardly extending U-shaped sealing portion. The liquid supplied to the conduit 21' comes into contact with the inert gas stream and is propelled through the evaporator as previously described. The chamber 88 of the vessel 84 is drained by means of the reflux rectifier supply conduit 53'.

The evaporator 80 which is utilized with this form of the invention is provided with an auxiliary drain 95 which opens into the top portion of the lowermost conduit of the evaporator and connects to the rich gas side of the heat exchanger or directly to a portion of the system containing liquid refrigerant, such as the rich solution return conduit 23.

In this form of the invention as well as in that previously described, the division chamber, the supply conduit to the evaporator and reflux rectifier are all embedded in the rear wall insulation of the cabinet 71. However, in this form of the invention the rear wall window element does not extend to the top portion of the cabinet but is only large enough to admit the evaporator into the chamber 71. The window is illustrated at 96 and is sealed with a suitable gasket indicated at 97.

In this form of the invention no gas lift pump is provided to lift the liquid refrigerant into the division chamber as the particular type of evaporator utilized permits the condenser to discharge directly into the bottom portion thereof by gravity and also permits the insertion of the division chamber 84 in the gravity supply line to the bottom portion of the evaporator. Due to the fact that the liquid refrigerant is circulated upwardly through the evaporator there is no necessity for the three-chamber arrangement illustrated in connection with Figures 1 and 2 in order to provide proper metering of the quantities of liquid supplied to the freezing and box-cooling portions of the evaporator. The type of evaporator illustrated and described in connection with Figure 3 inherently provides for this regulation.

The invention has been described in considerable detail; however, it is by no means limited to the precise construction and arrangement herein proposed. For example, more or less than three streams of refrigerant bearing any desired relationship to each other could be utilized as desired. One possible arrangement utilizing four streams of refrigerant for instance would arise in the event that the evaporator comprise two distinct ice-freezing evaporator sections in addition to the box-cooling section and the reflux rectifier arrangement. Moreover, the liquid dividing apparatus herein disclosed could be utilized in other portions of the refrigerating circuit and in other environments without departing from the invention.

The dividing device herein disclosed is peculiarly advantageous because of its simplicity, economy, reliability in operation and also because of the fact that it will continuously divide a very small stream of liquid into any desired number of unequal parts without becoming clogged or losing its effectiveness. This is highly advantageous and is a great improvement over prior devices which relied upon various mechanical means to accomplish this result, all of which were subject to very minute system disturbances, such as changes in liquid levels and variations in pressures as well as variations in the leveling of the apparatus and were at all times likely to become clogged by small particles of tramp material in the apparatus, to corrode or to lose their highly precise adjustment to a degree sufficient to render them useless.

The structure herein disclosed permits the refrigerating system to operate with maximum efficiency by reason of the precise and reliable division of the liquid refrigerant by the various wicks. With the arrangement herein disclosed the wicks may readily be nicely proportioned to any particular system to supply correct quantities of refrigerant to each section of the evaporator and to the reflux rectifier to the end that absorption solution is not permitted to pass through the rectifier and the supply of refrigerant to each section of the evaporator is nicely adjusted to the needs thereof.

The division chamber herein illustrated is readily susceptible of variation without departing from the invention. For example, it may take the form of an upstanding cylindrical vessel which encloses a concentric cylindrical wall. In this construction the liquid to be divided is supplied to the space enclosed by the cylindrical wall over which it will be carried by the wicks. The wick discharge chambers will be formed by angularly spaced partitions extending between the inner wall of the vessel and the cylindrical wall. This type of construction is particularly useful in machines which are likely to be installed in a non-level position as it substantially eliminates the effect of the tilt of the machine. This arrangement is also very compact.

In accordance with the present invention the liquid circulating in a refrigerating system may be diverted to a plurality of destinations in the form of a plurality of individual bodies bearing any desired ratio to each other. This is accomplished without moving parts, without danger of clogging any part of the system, requires no fine machining or adjusting and is independent of minor alterations in the internal and external conditions affecting the system.

While the invention has been illustrated and described herein in considerable detail, it is not to be construed as limited thereto as various changes may be made in the arrangement, construction and proportion of parts without departing from the spirit of the invention or the scope of the appended claims.

I claim:

1. Absorption refrigerating apparatus comprising a solution circuit including an absorber and a generator, a pressure equalizing medium circuit including said absorber and an evaporator, means for liquefying refrigerant vapor produced in said generator, means for conveying fixed portions of the liquid refrigerant into different portions of said evaporator, and means for conveying the balance of the liquid refrigerant into intimate contact with refrigerant vapor enroute to the liquefying means.

2. Absorption refrigerating apparatus comprising a solution circuit including an absorber and a generator, a pressure equalizing medium circuit including said absorber and an evaporator, means for liquefying refrigerant vapor produced in said generator, said evaporator including a finned box-cooling section and a freezing section, and means for supplying the liquefied refrigerant to said sections including means having no moving parts for limiting the quantity of liquid supplied to each of said sections to substantially fixed unequal portions of the quantity discharged by the liquefying means.

3. Absorption refrigerating apparatus comprising an insulated refrigerating chamber, a cooling air flue extending along one side of said chamber, an evaporator in said chamber, a condenser in the upper portion of said flue, a rectifier, means for conveying refrigerant vapor from said rectifier to said condenser, a capillary divider embedded in the wall of said insulated chamber connected to receive refrigerant liquid from said condenser, and means for conveying refrigerant liquid from said divider to said evaporator and to said rectifier.

4. Absorption refrigerating apparatus including a generator, a reflux rectifier, a condenser and an evaporator including box-cooling and freezing sections connected in circuit, a dividing member connected to receive liquid refrigerant from said condenser, said dividing member including an inlet chamber receiving liquid supplied from said condenser and a plurality of outlet chambers, means connecting said reflux rectifier and each of said evaporator sections to individual outlet chambers, and wicks extending from said inlet chamber into each of said outlet chambers, the wicks being of different sizes to supply metered quantities of refrigerant liquid to each section of said evaporator and to said reflux rectifier.

5. In an absorption refrigerating system including a generator, a condenser, means including a reflux rectifier connecting the generator and the condenser and an evaporator, the combination of a liquid flow regulating element connected to receive refrigerant from the condenser and including a plurality of wicks sealed within said system for directing streams of liquid refrigerant into said reflux rectifier and into different portions of said evaporator.

6. Refrigerating apparatus comprising a cooling unit having portions normally subjected to different load conditions, a source of supply of cooling medium, and means including a plurality of wicks sealed in said apparatus for feeding unbroken streams of cooling medium from said source to each of said portions of said cooling unit in fixed unequal percentages of the total quantity of cooling medium supplied from said source.

7. Refrigerating apparatus comprising an evaporator, a condenser extending to a level below the upper portion of the evaporator, means for supplying refrigerant vapor to the condenser, a liquid dividing element positioned to discharge into the upper portion of said evaporator by gravity, means for elevating liquid refrigerant discharged by said condenser into said dividing element, and means for conveying individual bodies of liquid refrigerant from said dividing element into said evaporator at a plurality of elevations.

8. An absorption refrigerating system comprising a pressure equalizing medium circuit including an evaporator and an absorber, a solution circuit including a boiler and said absorber, a liquefying element extending to an elevation below the upper end of said evaporator, means including a rectifying unit for conveying refrigerant vapor from said boiler to said condenser, diversion means positioned above the lower portion of said condenser including a plurality of capillary conveyors for directing unequal quantities of liquid refrigerant into spaced portions of said evaporator and into said rectifying unit, and a gas lift pump arranged to convey refrigerant liquid from said condenser to said diversion means.

9. An absorption refrigerating system comprising a pressure equalizing medium circuit including an evaporator and an absorber, a solution circuit including a boiler and said absorber, a liquefying element extending to an elevation below the upper end of said evaporator, means including a rectifying unit for conveying refrigerant vapor from said boiler to said condenser, diversion means positioned above the lower portion of said condenser including a plurality of capillary conveyors for directing unequal quantities of liquid refrigerant into spaced portions of said evaporator and into said rectifying unit, a gas lift pump arranged to convey refrigerant liquid from said condenser to said diversion means, means for returning pumping gas from said diversion means to said pressure equalizing medium circuit, and a cabinet including an insulated chamber housing said evaporator, said diversion means being embedded in the insulated wall of said chamber whereby the evaporative precooling of the liquid in said chamber is not lost by heating thereof.

10. Absorption refrigerating apparatus comprising an insulated refrigerating chamber, a cooling air flue extending along one side of said chamber, an evaporator in said chamber, a condenser in the upper portion of said flue, a rectifier in the lower portion of said flue, an air-cooled absorber arranged to be swept by air flowing through said flue, a boiler connected in circuit with said absorber and rectifier, means for conveying refrigerant vapor from said rectifier to said condenser, a capillary divider embedded in the wall of said insulated chamber connected to receive refrigerant liquid from said condenser, means for conveying refrigerant vapor from said evaporator to said absorber, and means at least partially encased in the wall of said insulated chamber for conveying refrigerant liquid from said divider to said evaporator and said rectifier.

11. Absorption refrigerating apparatus comprising an insulated refrigerating chamber, a cooling air flue extending along one side of said chamber, an evaporator in said chamber, a condenser in the upper portion of said flue, a rectifier, means for conveying refrigerant vapor from said rectifier to said condenser, a capillary divider embedded in the wall of said insulated chamber connected to receive refrigerant liquid from said condenser, means for conveying refrigerant liquid from said divider to the lower portion of said evaporator and to said rectifier, and power driven means for propelling an inert gas upwardly through said evaporator at a velocity sufficient to propel the refrigerant therethrough.

12. Absorption refrigerating apparatus comprising a solution circuit including an absorber and a generator, a pressure equalizing medium circuit including said absorber and an evaporator, means for liquefying refrigerant vapor produced in said boiler, a reflux rectifier interposed between said boiler and said liquefying means, and a plurality of capillary conveying means arranged to receive liquid refrigerant from said conveying means and to conduct restricted quantities of the refrigerant into said evaporator and into said reflux rectifier, a cabinet including an insulated chamber housing said evaporator and a cooling air chamber housing said absorber, a vertical wall of said chamber being provided with an opening extending to the top thereof to allow insertion of said evaporator, and an insulated panel carried by said apparatus for closing said opening, said capillary conveying means being encased in the upper portion of said panel.

13. A sealed absorption refrigerating system including a number of branches, a source of supply of liquid for said branches, means for conveying liquid from said source of liquid to said branches comprising a distributing chamber enclosing a plurality of wicks corresponding in number to the number of said branches sealed within said chamber, gas operated pumping means for conveying liquid from said source of liquid to said chamber, means for conveying the liquid discharged from each of said wicks into one of said branches, and means for purging said chamber of gaseous media.

14. An absorption refrigerating system including a plurality of vessels connected to form a plurality of paths of flow of liquid, means in one of said paths of flow for distributing liquid between a plurality of said vessels comprising a distributing chamber connected to receive liquid to be distributed, said chamber enclosing a plurality of wicks of unequal capacity for dividing the liquid supplied to said distributing chamber into a plurality of unequal streams of liquid, and means for conveying each stream of said liquid to one of said vessels, said last mentioned means including pressure balancing liquid seal means arranged to shield said distributing chamber from the pressure prevailing in the vessels to which the liquid is conveyed and to prevent gaseous media in said vessels from flowing into said chamber.

15. Absorption refrigerating apparatus comprising a plurality of vessels normally containing gaseous and liquid media connected to form a plurality of fluid circuits, one of said circuits including a plurality of said vessels and means for supplying liquid thereto from a common source comprising a distributing tank connected to receive liquid to be distributed from said source, a plurality of wicks in said tank arranged to receive liquid in common and to discharge liquid individually, conduits for conveying liquid discharged by each wick to a selected one of said vessels, one of said conduits being constructed and arranged to prevent passage of gaseous media to said chamber from the vessel into which said one conduit discharges, and means for relieving said tank of gaseous media.

16. Absorption refrigerating apparatus including a generator, a reflux rectifier, a condenser and an evaporator connected in circuit, a dividing member connected to receive liquid refrigerant from said condenser, said dividing member including an inlet chamber receiving liquid supplied from said condenser and a plurality of outlet chambers, a plurality of wicks arranged to convey liquid refrigerant from said inlet chamber into each of said outlet chambers, means for conducting the liquid discharged into said outlet chambers to said evaporator and to said reflux rectifier, and means for conveying gaseous media from said dividing member to a part of the apparatus normally containing gaseous media.

17. An absorption refrigerating system including a solution circuit including a boiler and an absorber, a pressure equalizing medium circuit including an evaporator and said absorber, a condenser, means including a rectifying element for conveying vapor from said boiler to said condenser, a pair of wicks of unequal capacity arranged to receive liquid refrigerant in common from said condenser, and means to convey the refrigerant discharged by the larger and smaller wicks to said evaporator and to said rectifying element, respectively, said last mentioned means including means for preventing gases and vapors in said evaporator and in said rectifier from flowing into said chamber.

18. Absorption refrigerating apparatus comprising a boiler and a generator connected for circulation of absorption solution therebetween, an evaporator connected to said absorber for circulation of inert gas therebetween, a condenser connected to receive refrigerant vapor from said generator, a liquid distributing vessel, a gas lift pump arranged to supply refrigerant liquid from said condenser to said vessel, liquid dividing means in said vessel arranged to divide the liquid supplied thereto into separate bodies of liquid, means for conveying each of said bodies of liquid to separate parts of said evaporator, and means for conveying inert gas and vapor from said vessel to a part of said apparatus normally containing inert gas.

19. Absorption refrigerating apparatus comprising a boiler and a generator connected for circulation of absorption solution therebetween, an evaporator connected to said absorber for circulation of inert gas therebetween, a rectifier arranged to receive refrigerant vapor from said generator, a condenser connected to receive refrigerant vapor from said rectifier, a liquid distributing vessel, a gas lift pump arranged to supply refrigerant liquid from said condenser to said vessel, liquid dividing means in said vessel arranged to divide the liquid supplied thereto into separate bodies of liquid, means for conveying said divided bodies to said evaporator and to said rectifier, and pressure balancing liquid seal means arranged to prevent passage of vapor from said rectifier to said vessel and to compensate said apparatus for pressure differences between said rectifier and said vessel.

GEO. A. BRACE.